United States Patent [19]

Narbaits-Jaureguy et al.

[11] 3,919,686
[45] Nov. 11, 1975

[54] ROUTE SURVEILLANCE SYSTEM
[75] Inventors: Jean-Raymond Narbaits-Jaureguy; Henri Billottet, both of Paris, France
[73] Assignee: Thomson-CSF, Paris, France
[22] Filed: July 2, 1973
[21] Appl. No.: 375,446

[30] Foreign Application Priority Data
July 7, 1972 France .................. 72.24750

[52] U.S. Cl. ............ 340/24; 340/38 R; 340/152 T; 343/6.5 R
[51] Int. Cl.² ............................. G08G 1/12
[58] Field of Search ..... 340/24, 152 T, 38 R, 147 R

[56] References Cited
UNITED STATES PATENTS
2,363,416  11/1944  Henroteau ................ 340/24
3,159,816  12/1964  Tiemann .................. 340/147 R
3,634,824  1/1972   Zinn ..................... 340/147 R Primary Examiner—Thomas B. Habecker
Attorney, Agent, or Firm—Karl F. Ross; Herbert Dubno

[57] ABSTRACT

A route or a section thereof is monitored by sensors distributed therealong which are identical and are triggered sequentially one from another after a certain delay in each case, the first of these sensors being triggered by a master pulse. The responses from the sensors which indicate the presence of a vehicle are retransmitted to a control device through the preceding sensors. The sensors comprise each a miniature transmitter and a miniature receiver which are slightly coupled to each other when in operation, the coupling being intensified in the presence of a vehicle in the operating zone of a sensor.

9 Claims, 2 Drawing Figures

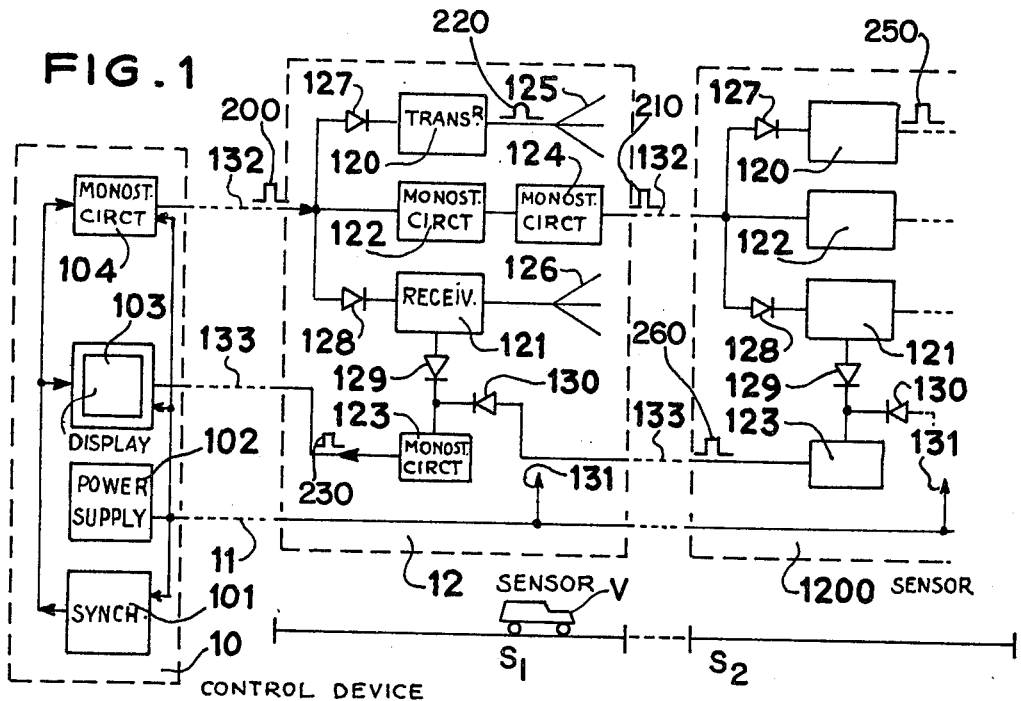
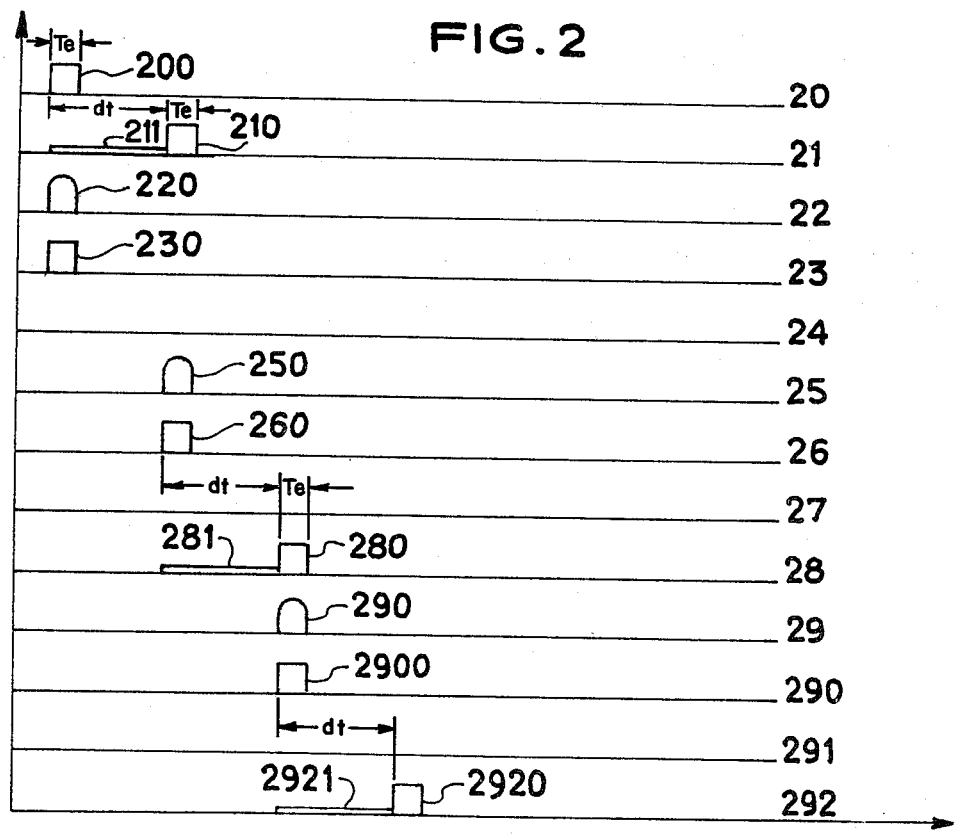

ROUTE SURVEILLANCE SYSTEM

FIELD OF THE INVENTION

The present invention relates to a system for the surveillance of a route.

BACKGROUND OF THE INVENTION

In the context of the problems posed by road traffic, which are growing incessantly with the increase in car parks, it is important for a control station to know the "situation", i.e., the state of saturation or near-saturation of the routes which it has the job of keeping under surveillance.

Various systems or devices are known which ascertain the number of moving objects passing through sections of a route and which add, as the case requires, other information relating, for example, to the position of the moving objects on the section in question, their distance from one another, their speed, etc.

These various systems or devices may include, for example, radars set up at specific points along a route section, or radars coupled to loss-type transmission lines whose length determines the length of the area under surveillance as disclosed in our copending application Ser. No. 375,444 of even date.

There exists, however, a problem of costs which increase with the complication of the system and the quantity of information to be extracted from it.

OBJECT OF THE INVENTION

The object of our present invention is to provide a system for the surveillance of a route which is less cumbersome and costly than conventional ones and is easy to use.

SUMMARY OF THE INVENTION

A traffic-surveillance system according to our invention comprises a series of sensors which are fixedly disposed along a route to be surveyed, the operating range of each sensor being limited to a route section respectively assigned to it; the several sections assigned to successive sensors in the series sequentially adjoin one another along the route. Each sensor includes normally inactive monitoring means triggerable into an active condition for emitting an output signal in the presence of a vehicle in the assigned route section, the trigger pulses for the activation thereof coming from a control post in the case of the first sensor and from an immediately preceding sensor in all other instances. The control post comprises a source of start or synchronizing pulses which serve as the trigger pulses for the first sensor and are transmitted thereto via a first two-way signal link which also serves to deliver to an indicator at the control post an output signal emitted by the monitoring means thereof in the presence of a vehicle in the assigned route section. Furthermore, each sensor preceding another one in the series is provided with pulse-generating means for producing an outgoing trigger pulse for the immediately successive sensor in response to an incoming trigger pulse from the control post or from the next-preceding sensor; the output signal of any sensor further down the line is retransmitted to the indicator of the control post by way of all intervening sensors.

In accordance with a further feature of our invention, the pulse-generating means giving rise to the outgoing trigger pulses replicates the incoming trigger pulses with a predetermined delay, with resulting staggering of the output signals delivered to the control post by the several sensors; the pulse-replicating means may comprise monostable circuits. The monitoring means of the several sensors may take the form of modules incorporating a transmitter and a low-power receiver of electromagnetic waves whose antennas are loosely coupled to each other under normal conditions, the coupling therebetween being intensified in the presence of a vehicle in the assigned route section.

One of the advantages of the present invention is that the modules used are all identical and that they may be installed along the section at intervals determined solely by the operating conditions with which the user has to contend.

BRIEF DESCRIPTION OF THE DRAWING

Other features and advantages of the present invention will appear in the course following description of one given with reference to the accompanying drawing in which:

FIG. 1 is a block diagram of one embodiment of our invention and

FIG. 2 is a time diagram showing the times of activation of the sensors of the system of FIG. 1.

DESCRIPTION OF A PREFERRED EMBODIMENT.

In FIG. 1, which shows a block diagram of our improved traffic-monitoring system, we have shown only the control device and two sensors; it is, however, understood that the number of sensors may be much greater.

Generally speaking, the sensors are identical and, in accordance with the invention, they are activated successively from the first to the last, the first being triggered by a master pulse and the others being triggered in succession by a pulse coming from the one before. These sensors, whose function is to detect the presence of vehicles in their operating area, may be designed in any known way, using optical, magnetic or electroacoustic devices, for example. In the embodiment of our invention about to be described by way of non-limiting example, the monitoring means of the sensors include each a transmitter and a receiver of electromagnetic waves.

The control post or device 10 comprises essentially a power supply 102, which may be self-contained or connected to a source of external energy which it transforms, a synchronizing device 101, a monostable circuit 104 and a display device 103. The power supply is connected to components 101, 103 and 104, and the synchronizing device works into components 103 and 104.

A first sensor such as component 12 takes the form of a module incorporating a miniature transmitter and a miniature receiver; this sensor is assigned to a section $S_1$ of a route traveled by one or more vehicles V. The miniature transmitter 120 is connected to a transmission antenna 125 and is triggered by a pulse 200 coming from the monostable circuit 104 of the control device 10, which passes through a diode 127. The miniature receiving 121 is connected to a receiver antenna 126 and is also connected to the monostable circuit 104 via a diode 128. Thus, the receiver and the transmitter of sensor 12 are triggered at the same time which prevents undesired triggering of the receiver and similarly of the transmitter by high-powered interference signals. The sensor also incorporates a monostable circuit 122, which is connected directly to monostable circuit 104 and also to a second monostable circuit 124 whose function will be explained below. The receiver of sensor 12 is also connected, via a diode 129, to a third monostable circuit 123 which is connected by a line 133 to the display device 103. A diode 130 connected to monostable circuit 123 provides a connection on the receiver side to the sensors situated beyond sensor 12, such as a sensor 1200 surveying a route section $S_2$. Line 133 and another line 132 form a two-way signal channel linking the control post 10 with the first sensor 12, this channel being duplicated between successive sensors.

Sensor 1200 is identical with sensor 12 just described and its circuits carry the same reference numerals as the identical circuits in sensor 12, which operate under the same conditions.

The power supply 102 of the control device 10 is connected to each of the sensors by a connection 11 in order to energize the constituent elements of each of them. For clarity in the Figure, the energizing circuits have been shown schematically by an arrow 131 from connection 11 to each of the sensors.

The assembly operates as follows (see also FIG. 2): at time zero, the synchronizing device 101 sends out a pulse which triggers operation of the display device 103 and the monostable circuit 104. The latter emits the pulse 200 of predetermined length Te which may, for example, be between 0.1 and a few microseconds.

This pulse 200 is applied via line 132 to the first sensor 12 in which, via diodes 127 and 128 respectively, it triggers transmitter 120 and receiver 121. The latter are thus activated simultaneously. At the same time pulse 200 triggers the monostable circuit 122 which in turn triggers another monostable circuit 124 which produces a replica of pulse 200 as a trigger pulse 210 whose duration Te is the same as that of pulse Te but which is delayed in relation to the latter by a predetermined time dt. This pulse is directed to a subsequent sensor, 1200 for example, where it performs the same function as the trigger pulse 200 applied to the first sensor. In particular, monostable circuit 124 of sensor 1200 produces a pulse 280, after a further delay equal to dt in relation to the pulse which has triggered it, which goes on to trigger the next sensor, this process continuing to the last sensor which has been set up along the route or the section of thoroughfare in question.

The transmitter 120 and the receiver 121 in a sensor are thus activated for a predetermined time Te. In other words, the transmitter emits a certain quantity of energy during this time Te and for the same time the receiver is capable of receiving part of this energy as a result of the fact that the metallic mass of a vehicle passing through the radiation zone of the transmitting antenna 125 alters the coupling of transmitting antenna 125 to receiving antenna 126. Such a mutual coupling has also been described in our copending application Ser. No. 375,470 of even date. Under these conditions, receiver 121 records a variation in the energy level which it receives and this variation produces a signal which indicates the presence of a vehicle passing over the sensor or situated in its effective area. In the activated state of the sensor, but when there is no vehicle present, the antennas 125 and 126 are slightly coupled to each other thereby producing a certain energy level in the receiver which increases the sensitivity of detection to variations in the received energy level when a vehicle is present.

The signal which indicates the presence of a vehicle in the effective zone of a sensor is applied, via diode 129, to monostable circuit 123 which transmits it as a pulse 230 to the display device 103 via line 133.

Any signal coming from a receiver in another sensor which is activated at a given time after the first sensor is transmitted under identical conditions via a diode 129 and a monostable circuit to the display device 103, but through the preceding sensors. Line 133, which collects the pulses delivered by the monostable circuits 123 of any succeeding sensor, is connected to monostable circuit 123 of the preceding sensor via a diode 130. It should, however, be noted that the monostable circuits 123 are selected to trigger rapidly on the leading edges of the operating pulse which they receive, so that the transmission of the signals to the display device 103 takes place without appreciable delay.

By measuring the time T which elapses between transmission of the synchronization pulse applied to monostable circuit 104 of the control device 10 and the arrival of a return pulse, it is possible to establish the ordinal position of the sensor from which the response originates. This position is given by the formula $T/dt + 1$.

Other factors are introduced by the conditions under which a system is employed.

For example, the repetition frequency of the system, that is to say the frequency with which the successive sensors are interrogated, depends on the number of responses desired to establish the presence of a vehicle in the operating zone of a sensor. It is necessary then to take into account the maximum speed of the vehicles situated in the area to be kept under surveillance, and the size of the smallest vehicle whose presence is to be noted. Furthermore, the effective area of a sensor depends on the antennas used and consequently on the frequencies allotted.

FIG. 2 shows a time-function graph summarizing the operation F of the system according to the invention.

Line 20 carries the start pulse 200 of duration Te which triggers the first sensor and comes from circuit 104 of the control device 10 (FIG. 1).

Line 21 carries the trigger pulse 210 for the succeeding sensor which is generated after a delay dt symbolized by the signal 211 and which is to trigger the second sensor.

Line 22 carries the monitoring pulse 220 transmitted by the antenna 125 of the transmitter of the first sensor.

Line 23 carries the response pulse 230 which is transmitted by the receiver 121 to the display device 103 in the event that a vehicle is present in the effective area of the first sensor.

Line 24 indicates that there is no vehicle in this area.

Line 25 carries the monitoring pulse 250 which is emitted from the transmitter of the second sensor triggered by pulse 210 (line 210).

Line 26 carries the response pulse 260 arriving at the receiver of the second sensor in the event that there is a vehicle present in its effective area. Where there is no vehicle present, no pulse is received (line 27).

Line 28 carries a pulse 280 produced as a replica of pulse 210 after a delay dt, symbolized by a signal 281 with respect to triggering pulse 210 for the second sensor. This pulse 280 serves to trigger the third sensor.

Line 29 carries a monitoring pulse 290 emitted by the transmitter of the third sensor which is triggered by pulse 280.

Line 290 carries a response pulse 2900 which indicates to the receiver of the third sensor to indicate that there is a vehicle in its effective area.

Line 291 indicates that there is no vehicle in this area.

Line 292 carries a pulse 2920 formed as a replica of pulse 280 after a delay $dt$, symbolized by a signal 2921, which acts to trigger the fourth sensor. This diagram may be continued for all the successive sensors in question.

The absolutely identical operation of the various sensors will be noted from this diagram, these sensors moreover incorporating identical components arranged in identical fashion. This characteristic facilitates maintenance and allows any sensor to be replaced by another in case of breakdown or faulty operation without the necessity for making special adjustments.

There has thus been described a system for the surveillance of a route which establishes the presence of vehicles in the effective areas of sensors distributed along the route which are activated sequentially from the triggering of the first sensor.

This system may be applied without difficulty to the surveillance of road traffic. It may also be used in other fields, such, for example, as that of navigation in ports or channels, or in any location in which the traffic routes can be exactly defined. The sensors used must then, of course, be adapted to the field in question.

What is claimed is:

1. A system for surveying traffic along a route, comprising:
   a series of sensors fixedly disposed along said route, each of said sensors having an operating range limited to a route section respectively assigned thereto, the route sections assigned to said series of sensors sequentially adjoining one another;
   normally inactive monitoring means in each sensor triggerable into an active condition for emitting an output signal in the presence of a vehicle in the assigned route section;
   a control post including a source of recurrent start pulses and indicator means for the output signals of said sensors;
   a first two-way signal link between said control post and the first sensor in the series for transmitting said start pulses to said monitoring means thereof to trigger same into said active condition and for delivering an output signal therefrom to said indicator means;
   a further two-way signal link between each preceding sensor and the immediately following sensor in the series for transmitting trigger pulses to the monitoring means of said immediately following sensor to activate same and for delivering an output signal therefrom to the immediately preceding sensor for retransmission to said indicator means by way of all intervening sensors; and
   pulse-generating means in each preceding sensor for producing an outgoing trigger pulse for the immediately succeeding sensor in response to an incoming trigger pulse from said control post in the case of said first sensor and from preceding sensors in all other instances.

2. A system as defined in claim 1 wherein said pulse-generating means includes pulse-replicating means operating with a predetermined delay period.

3. A system as defined in claim 2 wherein said pulse-replicating means comprises a monostable circuit.

4. A system as defined in claim 2 wherein said monitoring means comprises a transmitter and a receiver of electromagnetic waves each provided with an activating input, said activating inputs being connected in parallel with each other and with an input of said pulse-replicating means to a signal-link branch carrying incoming trigger pulses.

5. A system as defined in claim 4 wherein said transmitter and said receiver are provided with respective antennas loosely coupled to each other in the absence of near-by vehicles but intensifying the coupling in the presence of such vehicles.

6. A system as defined in claim 2 wherein said delay period is substantially identical for all sensors.

7. A system as defined in claim 2, further comprising signal-regenerating means in each preceding sensor connected to receive output signals from the monitoring means thereof and from any succeeding sensor for retransmission to said indicator means in their order of generation.

8. A system as defined in claim 7 wherein said signal-regenerating means comprises a monostable circuit.

9. A system as defined in claim 8 wherein said indicator means comprises a display device having a synchronizing input connected to said source of start pulses.

* * * * *